United States Patent [19]

Bertram et al.

[11] Patent Number: 4,665,149

[45] Date of Patent: May 12, 1987

[54] TRIAZINE CONTAINING EPOXY RESINS HAVING IMPROVED THERMAL STABILITY

[75] Inventors: James L. Bertram, Lake Jackson; Louis L. Walker, Clute, both of Tex.

[73] Assignee: The Dow Chemical Company, Midland, Mich.

[21] Appl. No.: 796,368

[22] Filed: Nov. 8, 1985

[51] Int. Cl.[4] .............................................. C08G 59/32
[52] U.S. Cl. ...................................... 528/96; 528/118
[58] Field of Search .................................. 528/118, 96

[56] References Cited

U.S. PATENT DOCUMENTS

| | | | |
|---|---|---|---|
| 2,506,486 | 5/1950 | Bender et al. | 260/47 |
| 2,741,607 | 4/1956 | Bradley et al. | 260/248 |
| 2,809,942 | 10/1957 | Cooke, Jr. | 260/2 |
| 2,810,706 | 10/1957 | Frazier et al. | 260/45.5 |
| 2,864,805 | 12/1958 | Cooke, Jr. | 260/47 |
| 2,971,942 | 2/1961 | Masters et al. | 260/2 |
| 3,351,673 | 11/1967 | Price | 528/118 X |
| 3,351,674 | 11/1967 | Masters | 528/118 X |
| 3,708,483 | 1/1973 | Anderson et al. | 260/248 CS |
| 4,487,915 | 12/1984 | Hefner, Jr. | 528/96 |
| 4,506,063 | 3/1985 | Hefner, Jr. | 528/96 |

FOREIGN PATENT DOCUMENTS 56-26925 3/1981 Japan .

*Primary Examiner*—Earl Nielsen
*Attorney, Agent, or Firm*—James G. Carter

[57] ABSTRACT

The thermal stability of epoxy resins prepared by dehydrohalogenating the reaction product of an epihalohydrin with an adduct prepared from a cyanuric halide and a polyhydric aromatic compound is improved by employing as the polyhydric aromatic compound one which is substituted with a hydrocarbyl group, a halogen atom or a nitro group at each ortho position relative to each aromatic hydroxyl group. These epoxy resins are useful in coating and molding compositions and in the preparation of laminates and composites.

3 Claims, No Drawings

TRIAZINE CONTAINING EPOXY RESINS HAVING IMPROVED THERMAL STABILITY

BACKGROUND OF THE INVENTION

The present invention concerns epoxy resins containing triazine groups having improved shelf stability.

Japanese Patent No. SHO 56-26925 discloses the preparation of epoxy resins from the reaction product of cyanuric chloride and an aromatic dihydroxy or polyhydroxy aromatic compound. While the Japanese patent discloses substituted and unsubstituted aromatic or polyhydroxy compounds, it only exemplified by working example unsubstituted aromatic dihydroxy compounds. It has been discovered that when the substituted aromatic di- or polyhydroxy compounds are employed, the resultant epoxy resin has shelf stability at much higher temperatures.

SUMMARY OF THE INVENTION

The present invention pertains to an improvement in an epoxy resin prepared by (I) reacting (A) the reaction product of (1) a cyanuric halide with (2) a polyhydric aromatic compound, with (B) an epihalohydrin; (II) dehydrohalogenating the resultant halohydrin intermediate product and (III) recovering the resultant polyglycidyl ether; wherein the improvement resides in employing as the polyhydric aromatic compound one which has two substituent groups independently selected from hydrocarbyl groups having from 1 to about 9 carbon atoms, halogen atoms or nitro groups in the ortho position relative to each aromatic hydroxyl group contained in said polyhydric aromatic compound thereby improving the thermal stability of the resultant polyglycidyl ether.

DETAILED DESCRIPTION OF THE INVENTION

Suitable cyanuric halides which can be employed herein include, for example, cyanuric chloride, cyanuric bromide, mixtures thereof and the like.

Suitable polyhydric aromatic compounds which can be employed herein include any such compounds having at least two aromatic hydroxyl groups and at least two substituents independently selected from hydrocarbyl groups having from 1 to about 9 carbon atoms, halogen atoms, or nitro groups in the ortho position relative to each aromatic hydroxyl group. These substituted polyhydric aromatic compounds include, for example, those substituted polyhydric aromatic compounds represented by the formulas

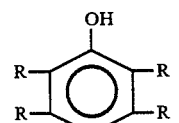

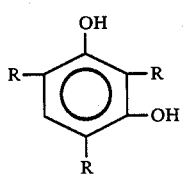

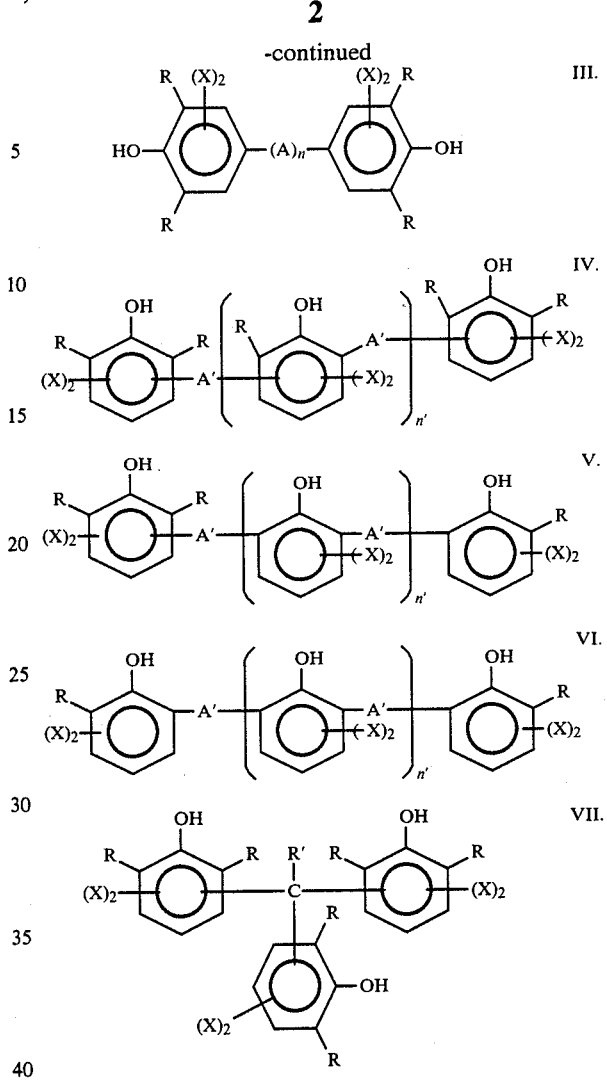

wherein A is a divalent hydrocarbyl group having from 1 to about 9 carbon atoms,

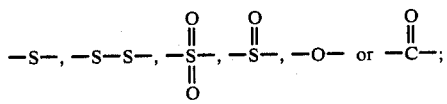

A' is a divalent hydrocarbyl group having from 1 to about 9 carbon atoms; each R is independently a hydrocarbyl group having from 1 to about 9 carbon atoms, a halogen or nitro group; R' is a hydrocarbyl group having from 1 to about 9 carbon atoms; each X is independently hydrogen, a hydrocarbyl group having from 1 to about 9 carbon atoms or a halogen; n has a value of zero or 1 and n' has a value from 0.001 to about 5.

Particularly suitable polyhydric aromatic compounds which can be employed herein include, for example, tetramethylbisphenol A, tetraethylbisphenol A, tetrachlorobisphenol A, tetrabromobisphenol A, tetramethylbisphenol F, tetraethylbisphenol F, tetrachlorobisphenol F, tetrabromobisphenol F, tetramethylbisphenol K, tetraethylbisphenol K, tetrachlorobisphenol K, tetrabromobisphenol K, tetramethylbisphenol S, tetraethylbisphenol S, tetrachlorobisphenol S, tetrabromobisphenol S, tetramethylbiphenol, tetrachlorobiphenol, tetrabromobiphenol, tetramethyltetrachlorobiphenol, tetramethyltetrabromobiphenol, tetramethyltrichlorobiphenol, tetramethyltribromobiphenol, mixtures thereof and the like.

Suitable epihalohydrins which can be employed herein include, for example, those represented by the formula

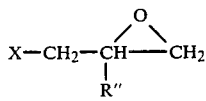

wherein R″ is an alkyl group having from 1 to about 4 carbon atoms, X is a halogen. Particularly suitable epihalohydrins include, for example, epichlorohydrin, epibromohydrin, epiiodohydrin, methylepichlorohydrin, methylepibromohydrin, methylepiiodohydrin, ethylepichlorohydrin, ethylepibromohydrin, ethylepiiodohydrin, mixtures thereof and the like.

Usually, the coupling reaction, the reaction between the reaction product of the polyhydric aromatic compound and the epihalohydrin is conducted in the presence of a catalyst. Particularly suitable as catalysts are the quaternary ammonium and phosphonium compounds, phosphines, tertiary amines, alkali metal hydroxides and the like such as, for example, benzyldimethylammonium chloride, ethyltriphenylphosphonium chloride, ethyltriphenylphosphonium acetate.acetic acid complex, tetrabutylphosphonium chloride, tetrabutylphosphonium acetate.acetic acid complex, benzyltrimethylammonium hydroxide, sodium hydroxide, potassium hydroxide, mixtures thereof and the like.

Suitable dehydrohalogenation agents include, for example, alkali metal hydroxides, aluminates, silicates, mixtures thereof and the like. Particularly suitable are sodium and potassium hydroxide.

In the reaction between the cyanuric halide with the polyhydric aromatic compound, the polyhydric aromatic compound is employed in a quantity which provides at least about 6, preferably from about 8 to about 15 aromatic hydroxyl groups per mole of cyanuric halide.

The glycidyl ethers of substituted polyhydric aromatic compounds of the present invention are useful in coatings, castings, electrical potting compositions, electrical and structural composites or laminates, molding compositions and the like.

The following examples are illustrative of the invention.

In the following examples, the thermal stability was determined by DSC, using a DuPont 1090 Thermal Analyzer with a 912 Differential Scanning Calorimeter. The heating rate was 10° C. per minute (0.167° C./s) under a nitrogen atmosphere. The temperature at which an exotherm became evident was taken as the relative temperature of that products thermal stability. This is the DSC exotherm temperature given for the epoxy products (actual thermal stability would be somewhat lower than this number).

EXAMPLE 1

A. Preparation of Tetrabromobisphenol A/Cyanuric Chloride Adduct (9 Hydroxyl Groups Per Mole of Cyanuric Chloride)

To a reaction flask equipped with a stirrer, reflux condenser, a nitrogen purge, and a temperature controlling device, were added 25.0 grams (0.136 mole) of cyanuric chloride, 331.88 grams (0.61 mole) of tetrabromobisphenol A, and a 356.88 grams of methyl ethyl ketone. While maintaining the temperature at 30° C. 34.24 grams (0.428 mole) of 50% aqueous caustic was slowly added during about 30 minutes (1800 s). The reaction mixture was stirred for an additional hour (3600 s) at 30° C., then for an additional hour (3600 s) at 60° C. The mixture was then cooled, and neutralized with hydrochloric acid, then the salt removed via water washing, then the solvent removed via vacuum distillation to about 150° C. When cooled, the product was a solid with a Mettler softening point of 126.9° C.

B. Preparation of Tetrabromobisphenol A/Cyanuric Chloride Adduct (12 Hydroxyl Groups Per Mole of Cyanuric Chloride)

The procedure of A above was repeated except that 443.9 grams (0.816 mole) of tetrabromobisphenol A was employed. The resultant product had a Mettler softening point of 107° C.

C. Preparation of Tetrabromobisphenol A/Cyanuric Chloride Adduct (15 Hydroxyl Groups Per Mole of Cyanuric Chloride)

The procedure of A above was repeated except that 554.9 grams (1.02 moles) of tetrabromobisphenol A was employed. The resultant product had a Mettler softening point of 96.3° C.

D. Epoxidation of the Product from A Above

In a flask equipped with a stirrer, nitrogen purge, and a device for controlling the temperature, were added 106.25 g of the TBBA/triazine adduct from A above, 185.0 grams (2 moles) of epichlorohydrin, 99.6 grams of isopropanol, and 16.1 grams of water. This mixture was heated to 65° C. and 9.0 grams (0.225 mole) of caustic dissolved in 36.0 grams of water were slowly added during about 45 minutes (2700 s) at 65° C., the aqueous layer was separated and discarded. An additional 300 grams of epichlorohydrin was added, then at 65° C., an additional 4.0 grams (0.1 mole) of caustic dissolved in 16.0 grams of water was slowly added during approximately 30 minutes (1800 s), then the mixture digested for an additional 15-20 minutes (900-1200 s) at 65° C. After cooling to ambient, the aqueous layer was separated and discarded. The organic phase was washed with water until free of salt. Then the solvent vacuum stripped to about 125° C. to yield a solid product with an epoxy content of 8.9% and a Mettler softening point of 104.5. Its melt viscosity at 150° C. was 1,100 cps (1.1 Pa. s). Analysis by a DuPont Model 912 Differential Scanning Calorimeter (DSC) in a nitrogen atmosphere at a heating rate of 10° C. per minute gave no evidence of thermal instability up to ≧215° C.

E. Dicyanamide Cure of the Epoxy Product of D Above

Ten grams of the epoxy product from D above were dissolved in 15 grams of methyl ethyl ketone. To this solution was added 3.5 grams of a 10% solution of dicyanamide dissolved in the monomethylether of ethylene glycol containing 0.83% benzyl dimethyl amine. The solvent was evaporated on a hotplate at 175° C., then the residue allowed to react at about 175° C. for 1 hour (3600 s). The insoluble crosslinked product had a glass transition temperature of 189.2° C. as measured by DSC using a DuPont 1090 Thermal Analyzer with a 912 Differential Scanning Calorimeter.

F. Diaminodiphenylsulfone Cure of the Epoxy Product of D Above

The epoxy resin from Example 1-D, 9.12 grams (0.0216 equivalent), was melt mixed at 150° C. with 1.34 grams (0.0216 equivalent) of diaminodiphenylsulfone and cured one hour (3600 s) at 150° C., 2 hours (7200 s) at 177° C., 2 hours (7200 s) at 200° C., and one hour (3600 s) at 225° C. The cured casting had a Tg of 222.8° C.

EXAMPLE 2

A. Preparation of 3,5,3',5'-Tetramethyl-4,4'-Dihydroxy-1,1'biphenyl/Cyanuric Chloride Adduct (12 Hydroxyl Groups Per Mole of Cyanuric Chloride)

In a reaction flask equipped as described in Example 1-A, 9.0 grams (0.0448 mole) of cyanuric chloride, 70.86 grams (0.2688 mole) of 3,5,3',5'-tetramethyl-4,4'-dihydroxy-1,1'-biphenyl, and 319.44 grams of methyl ethyl ketone were stirred and heated to 50° C. Fifty percent aqueous caustic, 12.88 grams (0.161 mole) was then added over a one hour (3600 s) period while maintaining temperature at 50° C. The temperature was then taken to 60° C. for one hour (3600 s). After cooling to ambient, the reaction mixture was neutralized with hydrochloric acid, washed with water to remove the salt, then the solvent removed via vacuum distillation up to 150° C. The product was a white solid at ambient temperature.

B. Epoxidation of the Product From A Above

The procedure of Example 1-D was followed using the following reactants. The product of A above (76.06 grams), 207.29 grams (1.76 moles) of epichlorohydrin, 111.61 grams of isopropanol, and 18.02 grams of water. In the first caustic addition step, 16.13 grams (0.403 mole) of caustic dissolved in 64.54 grams of water were added during about 45 minutes (2700 s), at 65° C. After digesting at 65° C. for about 15 minutes (900 s), the aqueous phase was separated and discarded, and 7.17 g (0.18 mole) of caustic dissolved in 28.68 grams of water was added during about 30 minutes (1800 s), digested at 65° C. for an additional 15–20 minutes (900–1200 s), cooled to ambient, water washed, and excess epichlorohydrin and solvent removed via vacuum distillation up to 100° C. for 30 minutes (1800 s). On standing at ambient temperature the product slowly solidified. Its epoxide content was 18.6%. DSC analysis as described in Example 1-D gave no indication of thermal instability up to ≧260° C.

C. Sulfanilimide Cure of the Product From B Above

The product from Example 2-B, 6.0 grams (0.026 equivalent) was melt mixed at 160° C. with 0.95 grams (0.022 equivalent) of sulfanilamide, and cured 4 hours (14,400 s) at 160° C. plus 3 hours (10,800 s) at 200° C. The cured resin had a Tg of 154.3° C.

D. Diaminodiphenylsulfone Cure of the Product From Example 2-B

The product from Example 2-B, 4.0 grams (0.173 equivalent) was melt mixed at 150° C. with 1.07 grams (0.173 equivalent) of diaminodiphenylsulfone and cured one hour (3600 s) at 150° C., 2 hours (7200 s) at 200° C., and one hour (3600 s) at 250° C. The cured casting had a Tg of 223.1° C.

COMPARATIVE EXPERIMENT A

1. Preparation of Bisphenol A/Cyanuric Chloride Adduct (12 Hydroxyl Groups Per Mole of Cyanuric Chloride)

Following the procedure of Example 1-A, 9 grams (0.0448 mole) of cyanuric chloride, 61.29 (0.269 mole) of bisphenol A, and 70.29 grams of methyl ethyl ketone were heated until temperature reached 50° C., then 12.88 grams (0.161 mole) of 50% aqueous caustic was added during about one hour (3600 s). The mixture was digested an additional hour (3600 s) at 60° C. The reaction contents was then cooled to ambient, and neutralized using concentrated hydrochloric acid. The organic phase was then washed with water to remove the salt formed, and the excess solvent removed by vacuum distillation up to 150° C. for 30 minutes (1800 s).

2. Epoxidation of the Product of 1 Above

The exact procedure of Example 7 was repeated using 40.83 grams of the bisphenol A/triazine adduct of A above, and the following charge: 152.35 grams (1.29 moles) of epichlorohydrin, 82.03 grams of isopropanol and 13.25 grams of water. In the first caustic addition step, 11.64 g (0.29 mole) of caustic dissolved in 46.56 grams of water were used. In the second step, 5.27 grams (0.132 mole) of caustic dissolved in 21.1 grams of water were used. The final product, a viscous liquid, had an epoxide content of 22.67%. The product showed an exotherm by DSC beginning at about 145° C. DSC analysis as described in Example 1-D showed a loss of thermal stability at <150° C.

3. Sulfanilimide Cure of the Product From 2 Above

The product from Comparative Experiment A-1, 6.0 grams (0.032 equivalent) was melt mixed at 160° C. with 1.15 grams (0.027 equivalent) of sulfanilamide and cured 4 hours (14,400 s) at 160° C. plus 3 hours (10,800 s) at 200° C. The cured resin had a Tg of 150.6° C.

4. Diaminodiphenylsulfone Cure of the Product From Comparative Experiment A-2

The procedure of Example 2-D was repeated, using 4.0 grams (0.021 equivalent) of the product from Comparative Experiment A-2, and 1.3 grams (0.021 equivalent) of diaminodiphenylsulfone. The cured sample had a Tg of 168.6° C.

EXAMPLE 3

A. Preparation of 2,6,2',6'-Tetrabromo-3,5,3',5'-Tetramethyl-4,4'-Dihydroxybiphenyl/Cyanuric Chloride Adduct (12 Hydroxyl Groups Per Mole of Cyanuric Chloride)

The procedure of Example 2-A was followed, using 3.3 grams (0.018 mole) of cyanuric chloride, 60.0 grams (0.11 mole) of the title compound, 253.2 grams of methylethylketone, and 4.5 grams (0.056 equivalent) of sodium hydroxide (50% aqueous solution).

B. Epoxidation of Product From A Above

The procedure of Example 2-B was followed, using 50 grams of the triazine adduct from Example 3-A, 79.18 grams of epichlorohydrin, 42.63 grams of isopropanol, 6.88 grams of water, 15.41 grams of 20% aqueous caustic in the first step, and 6.85 grams of 20% aqueous caustic for the second step. The epoxidized product had an epoxy content of 10.72. DSC analysis as described in Example 1-D gave no indication of thermal instability at ≧180° C.

C. Sulfanilamide Cure of the Product from B Above

The procedure of Example 2-C was followed, using 30 grams of the epoxy from Example 3-B and 2.73 grams of sulfanilamide. The cured product had a Tg of 214° C., with an exotherm.

D. Diaminodiphenylsulfone Cure of the Product From Example 2-C

The procedure of Example 2-D was followed, using 6.48 grams (0.016 equivalent) of the product from Example 3-B, and 1.0 gram (0.016 equivalent) of diaminodiphenylsulfone. The cured product had a Tg of >230° C.

We claim:
1. In an epoxy resin prepared by
   (I) reacting
      (A) the reaction product of
         (1) at least one cyanuric halide with
         (2) at least one polyhydric aromatic compound; with
      (B) at least one epihalohydrin;
   (II) dehydrohalogenating the resultant halohydrin ether product; and
   (III) recovering the resultant polyglycidyl ether; the improvement which comprises employing as the polyhydric aromatic compound one or more of such compounds which has two substituent groups independently selected from hydrocarbyl groups having from 1 to about 9 carbon atoms, halogen atoms or nitro groups in the ortho position relative to each aromatic hydroxyl group contained in said polyhydric aromatic compound thereby improving the thermal stability of the resultant polyglycidyl ether.

2. An epoxy resin of claim 1 wherein
   (i) component (I-A-1) is cyanuric chloride;
   (ii) component (I-A-2) is one or more substituted bisphenols; and
   (iii) component (B) is epichlorohydrin.

3. An epoxy resin of claim 2 wherin component (I-A-2) is tetramethylbisphenol A, tetrabromobisphenol A, tetracholorobisphenol A, tetramethylbiphenol, tetrabromobiphenol, tetramethyltetrabromobiphenol, tetramethyltribromobiphenol, tetramethylbisphenol F, tetrabromobisphenol F, tetrachlorobisphenol F, tetrabromobisphenol S, tetrachlorobisphenol S, tetramethylbisphenol K, tetrachlorobisphenol K, tetrabromobisphenol K, or a mixture thereof.

* * * * *